United States Patent [19]

McCoskey

[11] Patent Number: 5,414,431
[45] Date of Patent: May 9, 1995

[54] SATELLITE COMMUNICATION SYSTEM
[75] Inventor: John S. McCoskey, Derwood, Md.
[73] Assignee: GTE Spacenet Corporation, McLean, Va.
[21] Appl. No.: 460,202
[22] Filed: Jan. 2, 1990
[51] Int. Cl.$^6$ ............................................. H04B 7/185
[52] U.S. Cl. .................................... 342/352; 342/358; 342/367
[58] Field of Search ......................... 342/352, 358, 367

[56] References Cited
U.S. PATENT DOCUMENTS

| | | | |
|---|---|---|---|
| 3,317,909 | 5/1967 | Waetjen | 342/358 |
| 3,631,494 | 12/1971 | Gans et al. | 342/367 |
| 3,742,498 | 6/1973 | Dunn | 342/88 |
| 3,879,580 | 4/1975 | Schlosser et al. | 370/95.3 |
| 4,145,573 | 3/1979 | Arnold | 370/84 |
| 4,191,923 | 3/1980 | Schelisch | 455/13.2 |
| 4,485,383 | 11/1984 | Maher | 342/352 |
| 4,574,379 | 3/1986 | Eng et al. | 370/95.3 |
| 4,586,051 | 4/1986 | Saitto et al. | 342/358 X |
| 4,599,619 | 7/1986 | Keigler et al. | 342/352 |
| 4,630,058 | 12/1986 | Brown | 342/359 |
| 4,763,129 | 8/1988 | Perotta | 342/356 |
| 4,872,015 | 10/1989 | Rosen | 342/353 |
| 4,901,368 | 2/1990 | Arnold et al. | 455/12 |
| 4,941,155 | 7/1990 | Chuang et al. | 375/84 |
| 5,053,782 | 10/1991 | Levinberg et al. | 342/352 |

Primary Examiner—John B. Sotomayor
Attorney, Agent, or Firm—J. Stephen Yeo

[57] ABSTRACT

A satellite communication system in which a satellite receives a signal on a uplink carrier frequency, frequency translates it, and transmits the signal at a downlink carrier frequency. The downlink carrier frequency differs from the uplink carrier frequency by a standard frequency offset and a frequency offset error. A terminal earth station transmits to the satellite an inbound signal on the uplink carrier frequency. A hub earth station continually transmits to the satellite an outbound signal on an uplink carrier frequency and receives from the satellite the outbound signal at the downlink carrier frequency. The hub strips the outbound signal from the downlink carrier frequency and compares the stripped downlink carrier frequency to the reference carrier. A frequency offset error signal corresponding to the frequency offset error is generated. The hub receives the inbound signal at the downlink carrier frequency, and adjusts the processing of the inbound signal in response to the offset frequency error signal to compensate for the offset frequency error. The invention allows the hub to have the characteristics of a Very Small Antenna Terminal characterized by low-cost, solid-state converters and amplifiers, with a small three meter or less diameter dish antenna at Ku-band.

8 Claims, 1 Drawing Sheet

SATELLITE COMMUNICATION SYSTEM

BACKGROUND OF THE INVENTION

This invention pertains to satellite communication systems and more particularly is concerned with systems correcting for frequency errors.

A typical satellite communication system includes a hub earth station, a geostationary satellite, and a plurality of terminal earth stations. The hub provides a continuous outbound transmission, while the terminals provide bursts of inbound transmissions. Transmission from any earth station to the satellite is called uplink. Transmission from the satellite to earth stations is called downlink.

When the satellite receives an uplink signal, it frequency translates the signal by mixing with a local oscillator to a downlink carrier frequency, and transmits the signal downlink to the earth stations at the downlink carrier frequency. The downlink carrier frequency differs from the uplink carrier frequency by a standard frequency offset, e.g. 2.3 Ghz, and an unknown frequency offset error due to the satellite's local oscillator and doppler shift due to satellite movement. The hub burst demodulators have a narrow frequency, necessitating reduction of the frequency uncertainty of the received signal.

Some satellite communication equipment use a pilot signal to determine frequency shift. This technique adds to the cost and complexity of a system and uses up part of the available frequency spectrum.

SUMMARY OF THE INVENTION

Briefly, there is provided a satellite communication system in which a satellite receives a signal on a uplink carrier frequency, frequency translates it, and transmits the signal at a downlink carrier frequency. The downlink carrier frequency differs from the uplink carrier frequency by a standard frequency offset and a frequency offset error. A terminal earth station transmits to the satellite an inbound signal on the uplink carrier frequency. A hub earth station continually transmits to the satellite an outbound signal on an uplink carrier frequency and receives from the satellite the outbound signal at the downlink carrier frequency. The hub strips the outbound signal from the downlink carrier frequency and compares the stripped downlink carrier frequency to the reference carrier. A frequency offset error signal corresponding to the frequency offset error is generated. The hub receives the inbound signal at the downlink carrier frequency, and adjusts the processing of the inbound signal in response to the offset frequency error signal to compensate for the offset frequency error. A pilot signal or synchronization is not required between the hub earth station and the terminal earth station for compensating offset frequency error.

DETAILED DESCRIPTION OF THE INVENTION

Figure 1:
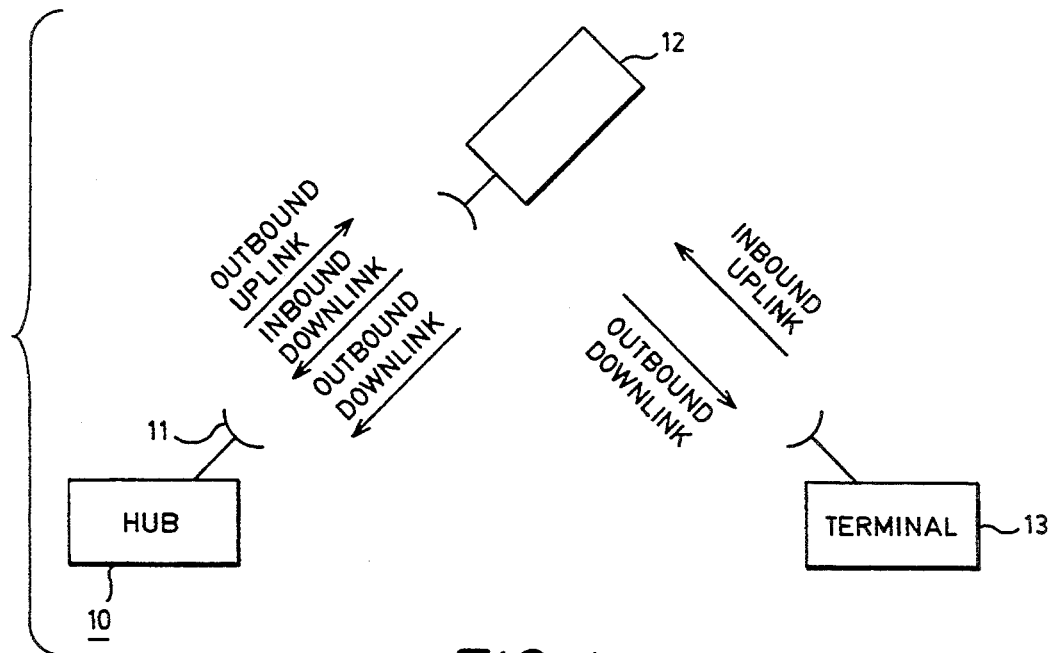
FIG. 1 is a block diagram of a satellite communication system, embodying the invention, including a hub earth station, a satellite, and a terminal earth station.

FIG. 1 is a block diagram of a satellite communication system including a hub earth station 10 with antenna 11, a satellite 12, and a terminal earth station 13 representing a plurality of terminal earth stations.

The system is characterized by a continuous outbound carrier from the hub 10 and incoming burst carriers from the terminal 13.

The hub earth station 10 continuously transmits to the satellite 12 an outbound signal including an embedded clock signal, e.g. 112 Khz, at an uplink carrier frequency.

The satellite 12 receives the outbound uplink signal, frequency translates it by mixing with a local oscillator to a downlink carrier frequency, and transmits it at the downlink carrier frequency to the hub and terminal earth stations 10, 13. The downlink carrier frequency differs from the uplink carrier frequency by a standard frequency offset, e.g. 2.3 Ghz for Ku band carriers, and an unknown, and continuously variable, frequency offset error due to the satellite's local oscillator and/or doppler error. Both the hub earth station 10 and the terminal earth station 13 receive the outbound signal from the satellite 12 at the downlink carrier frequency.

Figure 2:
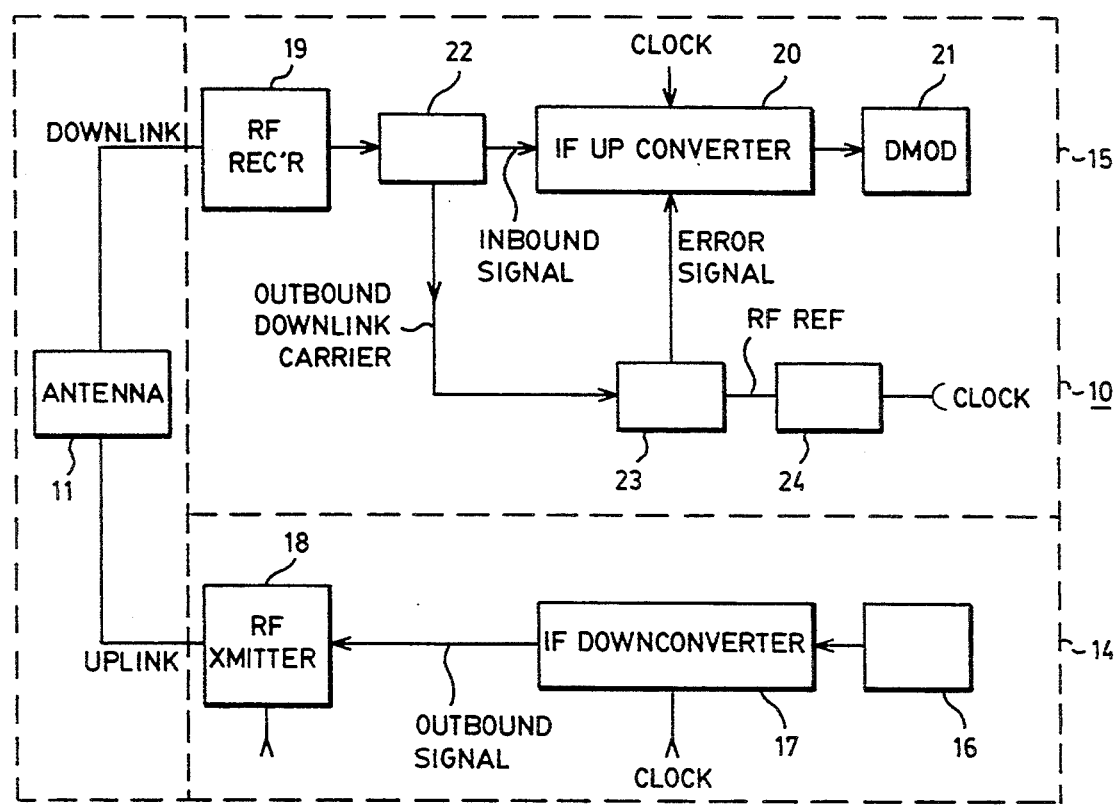
FIG. 2 is a block diagram of certain features of the hub station.

As seen in FIG. 2, the hub 10 includes in addition to antenna 11, a transmit chain 14 and a receive chain 15. The transmit chain 14 includes a continuous carrier modulator 16, an IF downconverter 17, and an RF transmitter 18. The downconverter 17 translates an IF signal in the 140 MHz band from the continuous carrier modulator 16 to the 70 MHz band for the uplink carrier frequency of the RF transmitter 18. The hub earth station 10 strips the clock signal from the outbound signal, from either the uplink or downlink, and locks the uplink carrier frequency generated by the RF transmitter 18 to the clock signal. As the error changes, the hub station tracks the frequency error and compensates for it, maintaining a lock condition. The frequency reference for the downconverter 17 is also derived from the clock of the outbound carrier.

The receive chain 15 includes a RF receiver 19, including an IF upconverter 20 and burst demodulators 21. The upconverter 20 translates an IF signal in the 70 MHz band from the RF downlink signal to the 140 MHz band for the demodulators 21. The frequency reference for the upconversion is also derived from the system clock of the outbound signal.

The RF receiver 19 detects the hub's outbound signal as translated by the satellite 12. A demodulator 22 removes the modulation from the downlink carrier. The downlink carrier frequency is compared by a frequency comparitor 23, such as a RF mixer, to a high quality reference carrier generated by RF generator 24, which preferably is a frequency-agile synthesizer locked to the system clock. The reference carrier is set to the downlink frequency without an offset error. The frequency difference between the reference and the downlink is therefore the received frequency offset error. The comparitor 23 compensates for this error by providing a corresponding correction error signal coupled to the upconverter 23.

The terminal earth station 13 meanwhile transmits to the satellite 12 bursts of an inbound signal at the system's uplink carrier frequency. The satellite 12 receives, frequency translates, and transmits the inbound signal at a downlink carrier frequency, which has the same frequency offset error incurred by the downlink translation of the outbound signal. The hub earth station 10 receives from the satellite 12 the inbound signal at the downlink carrier frequency.

The upconverter 23 is adjusted in response to the error signal to compensate for the offset frequency error during frequency translation processing of the inbound IF signal.

As seen from the forgoing description and drawings, a pilot signal or synchronization is not required between the hub earth station and the terminal earth station for compensating offset frequency error.

The described invention allows the hub to have the characteristics of a Very Small Aperture Terminal. A VSAT is characterized by low-cost, solid-state converters and amplifiers, with a small three meter or less diameter dish antenna at Ku-band. The antenna diameter may be scaled inversely to frequency. Previously, hubs have required expensive so called rack and stack electronics and a large antenna having a dish diameter of ten or more meters.

The preferred embodiment of the invention and best mode of practicing the invention have been disclosed. Variations and modifications thereto will now be apparent to skilled in the art in light of these teachings. According the scope of the invention is to be determined by the following claims.

What is claimed is:

1. A satellite communication system comprising:
   a satellite having means for receiving a signal on an uplink carrier frequency, frequency translating, and transmitting said signal at a downlink carrier frequency, said downlink carrier frequency differing from said uplink carrier frequency by a standard frequency offset and a frequency offset error;
   a terminal earth station for transmitting to said satellite an inbound signal on said uplink carrier frequency; and
   a hub earth station including:
   means for continually transmitting to said satellite an outbound signal on said uplink carrier frequency;
   means for receiving from said satellite said outbound signal at said downlink carrier frequency;
   means for stripping the outbound signal from said downlink carrier frequency;
   means for providing a reference carrier;
   means for comparing said stripped downlink carrier frequency to said reference carrier and for providing a frequency offset error signal corresponding to the frequency offset error;
   means for receiving from said satellite said inbound signal at said downlink carrier frequency, and
   means for adjusting the processing of said inbound signal in response to said offset frequency error signal to compensate for said offset frequency error, said satellite communication system not requiring a pilot signalor synchronization between the hub earth station and the terminal earth station.

2. The satellite communication system of claim 1 wherein said hub earth station includes an antenna having a size equivalent to three meters or less diameter dish at an carrier frequency at Ku band.

3. A satellite communication system comprising:
   a satellite having means for receiving a signal on an uplink carrier frequency, frequency translating, and transmitting said signal at a downlink carrier frequency, said downlink carrier frequency differing from said uplink carrier frequency by a standard frequency offset and a frequency offset error;
   a terminal earth station for transmitting to said satellite an inbound signal on said uplink carrier frequency; and
   a hub earth station including:
   means for continually transmitting to said satellite an outbound signal including a clock signal on said uplink carrier frequency;
   means for receiving from said satellite said outbound signal at said downlink carrier frequency;
   means for stripping said clock signal from said outbound signal and for locking said uplink carrier frequency to said clock signal;
   means for stripping the outbound signal from said downlink carrier frequency;
   means for providing a reference carrier locked to said clock signal;
   means for comparing said stripped downlink carrier frequency to said reference carrier for providing a frequency offset error signal corresponding to the frequency offset error;
   means for receiving from said satellite said inbound signal at said downlink carrier frequency; and
   means for adjusting the intermediate frequency of said inbound signal in response to said offset frequency error signal to compensate for said offset frequency error, said satellite communication system not requiring a pilot signalor synchronization between the hub earth station and the terminal earth station.

4. The satellite communication system of claim 3 wherein said hub earth station includes an antenna having a size equivalent to three meters or less diameter dish at an carrier frequency at Ku band.

5. A hub earth station including:
   means for continually transmitting an outbound signal on an uplink carrier frequency;
   means for receiving said outbound signal at a downlink carrier frequency;
   means for stripping the outbound signal from said downlink carrier frequency;
   means for providing a reference carrier;
   means for comparing said stripped downlink carrier frequency to said reference carrier and for providing a frequency offset error signal corresponding to the frequency offset error;
   means for receiving an inbound signal at said downlink carrier frequency; and
   means for adjusting the processing of said inbound signal in response to said offset frequency error signal to compensate for said offset frequency error, said hub earth station not requiring a pilot signal or synchronization between the hub earth station other earth stations.

6. The hub earth station of claim 5 wherein said hub earth station includes an antenna having a size equivalent to three meters or less diameter dish at carrier frequency at Ku band.

7. A hub earth station including:
   means for continually transmitting an outbound signal including a clock signal on an uplink carrier frequency;
   means for receiving said outbound signal at a downlink carrier frequency;
   means for stripping said clock signal from said outbound signal and for locking said uplink carrier frequency to said clock signal;
   means for stripping the outbound signal from said downlink carrier frequency;
   means for providing a reference carrier locked to said clock signal;

means for comparing said stripped downlink carrier frequency to said reference carrier for providing a frequency offset error signal corresponding to the frequency offset;
means for receiving an inbound signal at said downlink carrier frequency; and
means for adjusting the intermediate frequency of said inbound signal in response to said offset frequency error signal to compensate for said offset frequency error, said hub earth station not requiring a pilot signal or synchronization between the hub earth station other earth stations.

8. The hub earth station of claim 7 wherein said hub earth station includes an antenna having a size equivalent to a three meters or less diameter dish at a carrier frequency at Ku band.

* * * * *